(12) United States Patent
Pham et al.

(10) Patent No.: US 7,675,862 B2
(45) Date of Patent: Mar. 9, 2010

(54) NETWORKING HARDWARE ELEMENT TO COUPLE COMPUTER NETWORK ELEMENTS AND METHOD OF DISPLAYING A NETWORK LAYOUT MAP THEREON

(75) Inventors: Anthony Pham, S. San Gabriel, CA (US); Steven Lin, Cerritos, CA (US); Jonathan Bettino, Huntington Beach, CA (US); David Hoard, Escondido, CA (US)

(73) Assignee: Belkin International, Inc., Compton, CA (US)

( * ) Notice: Subject to any disclaimer, the term of this patent is extended or adjusted under 35 U.S.C. 154(b) by 696 days.

(21) Appl. No.: 11/506,351

(22) Filed: Aug. 17, 2006

(65) Prior Publication Data
US 2008/0043626 A1 Feb. 21, 2008

(51) Int. Cl.
H04L 12/26 (2006.01)
(52) U.S. Cl. .................... 370/241; 370/245
(58) Field of Classification Search ............ 370/241, 370/245, 357, 360
See application file for complete search history.

(56) References Cited

U.S. PATENT DOCUMENTS

| | | | |
|---|---|---|---|
| 4,134,537 A | 1/1979 | Glaser et al. |
| 4,680,455 A | 7/1987 | Kuo |
| 4,814,588 A | 3/1989 | Hotta et al. |
| 5,113,612 A | 5/1992 | Machen |
| 5,192,150 A | 3/1993 | Ruggeberg |
| 5,276,789 A | 1/1994 | Besaw et al. |
| 5,363,366 A | 11/1994 | Wisdom, Jr. et al. |
| 5,699,056 A | 12/1997 | Yoshida |
| 5,732,464 A | 3/1998 | Lamont |
| 5,825,775 A | 10/1998 | Chin et al. |
| 6,067,093 A | 5/2000 | Grau et al. |
| 6,177,873 B1 | 1/2001 | Cragun |
| 6,885,667 B1 | 4/2005 | Wilson |
| 7,142,106 B2 | 11/2006 | Scoggins |
| 7,363,483 B2 | 4/2008 | Kumagai |
| 2001/0053134 A1 | 12/2001 | Fillebrown et al. |

(Continued)

FOREIGN PATENT DOCUMENTS

DE    3340543    5/1985

(Continued)

OTHER PUBLICATIONS

European Search Report for Application No. 07253236.9-2416 dated Nov. 28, 2007.

(Continued)

*Primary Examiner*—Chirag G Shah
*Assistant Examiner*—Minh-Trang Nguyen
(74) *Attorney, Agent, or Firm*—Bryan Cave LLP

(57) ABSTRACT

In one embodiment, a networking hardware element (1100, 3100) capable of coupling computer network elements (1010) comprises a network diagnostic mechanism (2140) that is capable of mapping the computer network elements and that is also capable of determining a connection status for the computer network elements. The networking hardware element also comprises a display (2110, 3110, 5110) that is capable of communicating with the network diagnostic mechanism and that is also capable of displaying a network layout map (2111, 5111) of representations of the computer network elements and the connection status of the computer network elements.

28 Claims, 7 Drawing Sheets

U.S. PATENT DOCUMENTS

| | | | |
|---|---|---|---|
| 2002/0161875 A1 | 10/2002 | Raymond | |
| 2002/0164223 A1 | 11/2002 | Ryan et al. | |
| 2003/0112958 A1 | 6/2003 | Beaudoin et al. | |
| 2004/0003285 A1 | 1/2004 | Whelan et al. | |
| 2004/0117831 A1 | 6/2004 | Ellis et al. | |
| 2004/0199628 A1 | 10/2004 | Wu | |
| 2004/0218541 A1 | 11/2004 | Lee | |
| 2004/0218544 A1* | 11/2004 | Lee | 370/252 |
| 2004/0267924 A1 | 12/2004 | Yang et al. | |
| 2005/0015644 A1* | 1/2005 | Chu et al. | 714/4 |
| 2005/0050318 A1 | 3/2005 | Alone et al. | |
| 2005/0091063 A1 | 4/2005 | Bergemann et al. | |
| 2005/0108557 A1 | 5/2005 | Kayo et al. | |
| 2005/0148326 A1 | 7/2005 | Nogawa et al. | |
| 2005/0201557 A1 | 9/2005 | Ishidoshiro | |
| 2005/0262223 A1 | 11/2005 | Kimura | |
| 2006/0028398 A1 | 2/2006 | Willmore | |
| 2006/0155835 A1 | 7/2006 | Forutanpour | |
| 2006/0174034 A1 | 8/2006 | Shand et al. | |
| 2006/0187890 A1* | 8/2006 | Lin | 370/338 |
| 2007/0111568 A1 | 5/2007 | Ferrari et al. | |
| 2007/0204231 A1* | 8/2007 | Cunningham et al. | 715/734 |
| 2008/0046561 A1* | 2/2008 | Pham et al. | 709/224 |
| 2008/0095086 A1 | 4/2008 | Linkola et al. | |

FOREIGN PATENT DOCUMENTS

| | | |
|---|---|---|
| EP | 0881871 | 12/1998 |
| EP | 0973308 | 1/2000 |
| EP | 1102426 | 5/2001 |
| EP | 1246053 | 10/2002 |
| EP | 1463236 | 9/2004 |
| GB | 2333418 | 7/1999 |
| JP | 9181722 | 7/1997 |
| WO | WO 0056017 | 9/2000 |

OTHER PUBLICATIONS

ONE Internet Services "a la carte"™; For SMEs/SMIs that are looking to upgrade their existing Internet architecture; http://support.rightvision.com/files/Eye-box_ONE_en.pdf; 2001; 2 pages.

Examination Report for Application No. 560717; Aug. 23, 2007; 2 pages.

Linksys® A Division of Cisco Systems, Inc.; Wireless-G Broadband Router;http://www.linksys.com/servlet/Satellite?c=L_Product_C2&childpagename=US%2Flayout&cid=1115416825557&pagename=Linksys%2Fcommon%2FvisitorWrapper; retrieved from the internet on Aug. 11, 2006.

Ericsson; "User Guide Dialog 3213"; http://www.zid.tuwien.ac.at/typo3conf/ext/user_tuwien_links/download.php?cuid=1960%file= fileadmin%2Ffiles_kom%2Fanleitungen%2Ftelefonie%2Fug_3213_bc7to10_en.pdf>; 2001.

Ferguson, Andrew: "Netgear DG834G ADSL Modem / Wireless Router Review"; URL:http://www.thinkbroadband.com/hardware/reviews/2004/q3/netgear-dg834g.html> Aug. 3, 2004.

European Search Report for Application No. 07253304.5-1238; Nov. 16, 2007.

Linksys® A Divison of Cisco Systems, Inc.; 2.4 GHz Wireless-G Broadband Router;http://www.linksys.com/servlet/Satellite?c=L-Product_C2&childpagename=US%2Flayout&cid=1115416825557&pagename=Linksys%2Fcommon%2FvisitorWrapper; retrieved from the internet on Aug. 11, 2006.

Linksys® A Division of Cisco Systems, Inc.; 2.4 GHz Wireless-G Broadband Router;http://www.linksys.com/servlet/Satellite?c=L-Product_C2&childpagename=US%2Flayout&cid=1149562300349&pagename=Linksys%2Fcommon%2FvisitorWrapper; retrieved from the internet on Aug. 11, 2006.

* cited by examiner

NETWORKING HARDWARE ELEMENT TO COUPLE COMPUTER NETWORK ELEMENTS AND METHOD OF DISPLAYING A NETWORK LAYOUT MAP THEREON

FIELD OF THE INVENTION

This invention relates generally to computer networks, and relates more particularly to the monitoring and management of computer networks.

BACKGROUND OF THE INVENTION

Computer networks include a variety of elements such as computers, printers, modems, and the like. Computer networks also often include networking hardware elements, such as wireless and/or wired routers, to electrically couple the various computer network elements to each other. From time to time, however, these computer networks have performance problems. Computer network administrators or other users attempting to address such performance problems often receive information about the computer system through a display on the networking hardware elements, and/or through a user interface on the computers. Existing user interfaces vary widely with respect to the nature and the amount of interaction they allow, but none are ideal in terms of the diagnostic information and problem solving advice they provide to the user. In addition, user interfaces are often complicated and difficult for a novice user to understand and use. Accordingly, there exists a need for an improved apparatus and method to monitor and manage computer networks.

BRIEF DESCRIPTION OF THE DRAWINGS

The invention will be better understood from a reading of the following detailed description, taken in conjunction with the accompanying figures in the drawings in which.

Figure 1:
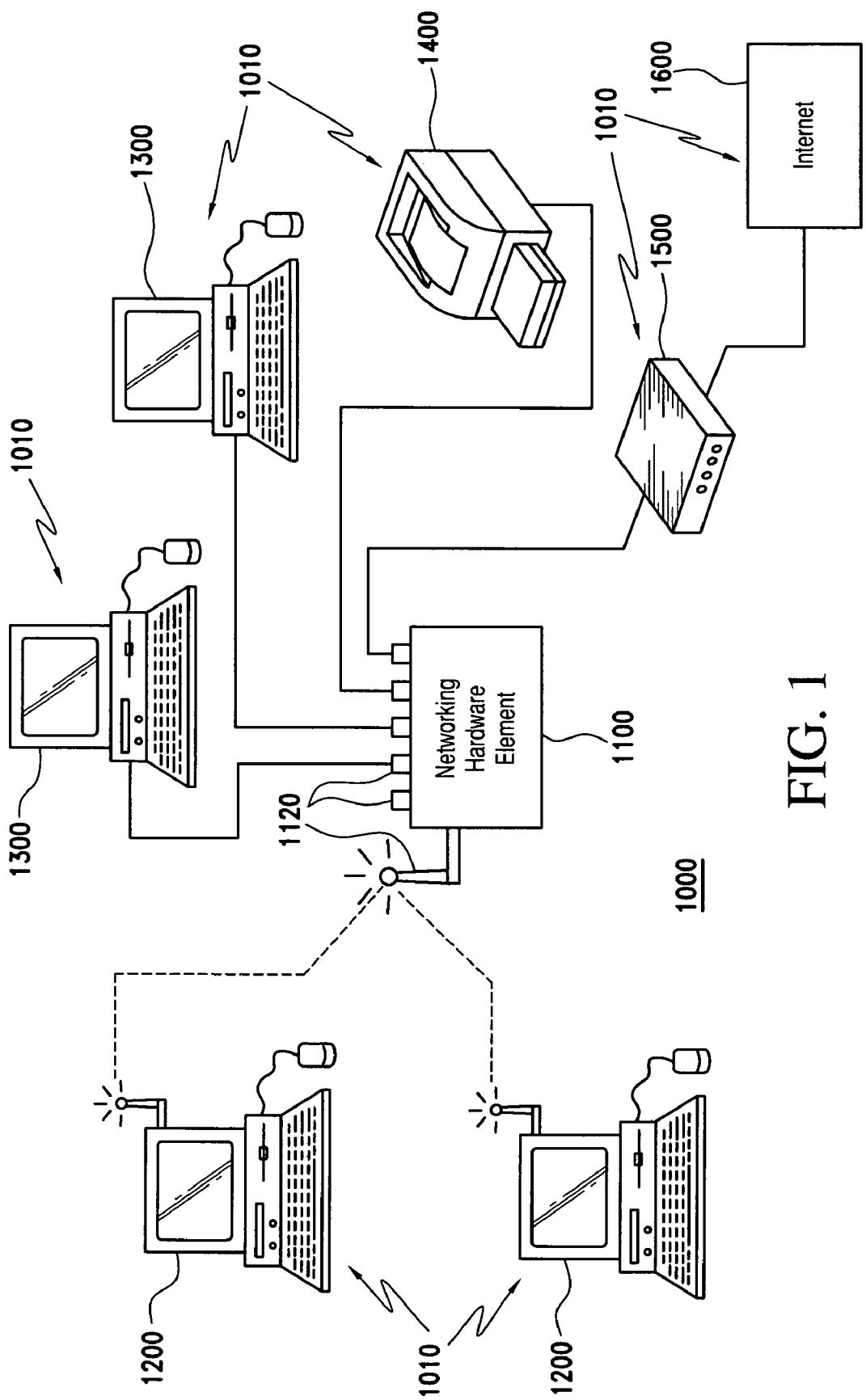
FIG. 1 illustrates a computer network in accordance with an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment, a networking hardware element capable of coupling computer network elements comprises a network diagnostic mechanism that is capable of mapping the computer network elements and that is also capable of determining a connection status for the computer network elements. The networking hardware element also comprises a display that is capable of communicating with the network diagnostic mechanism and that is also capable of displaying a network layout map of representations of the computer network elements and the connection status of the computer network elements.

Referring now to the figures, FIG. 1 illustrates a computer network 1000. Computer network 1000 includes computer network elements 1010 and a networking hardware element 1100. Networking hardware element 1100 couples computer network elements 1010 together and, as explained in more detail hereinafter, is capable of displaying a network layout map of computer network 1000. Networking hardware element 1100 can represent, for example, a router, a hub such as a networking hub or a universal serial bus hub, a switch, a wireless network access point, a wireless networking card, or any other device used to couple computer network elements 1010 and to route communication signals between computer network elements 1010. Networking hardware element 1100 is not a computer.

As an example, computer network elements 1010 can include at least one modem 1500, one or more wired computers 1300 connected through networking hardware element 1100 through a wired connection, one or more wireless computers 1200 connected to networking hardware element 1100 through a wireless connection, one or more printers 1400, and Internet 1600. Modem 1500 couples networking hardware element 1100 to Internet 1600.

Each of computer network elements 1010 are coupled through wired or wireless connections to networking hardware element 1100 via terminals 1120 of networking hardware element 1100. Terminals 1120 can be mechanical terminals such as Universal Serial Bus (USB) ports, telephone jacks such as of the RJ-11 and RJ-14 types, Ethernet jacks such as of the RJ-45 type, or any other suitable connection mechanism to couple computer network elements 1010. Terminals 1120 can also be wireless terminals, such as one or more antennae to send and receive signals in accordance with wireless communications standards like IEEE 802.11. Terminals 1120 can also be referred to as router terminals when networking hardware element 1100 is a router. Although printer 1400 and modem 1500 are illustrated in FIG. 1 to be hardwired to networking hardware element 1100, one skilled in the art will understand that either or both of printer 1400 and modem 1500 can be coupled to networking hardware element 1100 via a wireless connection.

Figure 2:
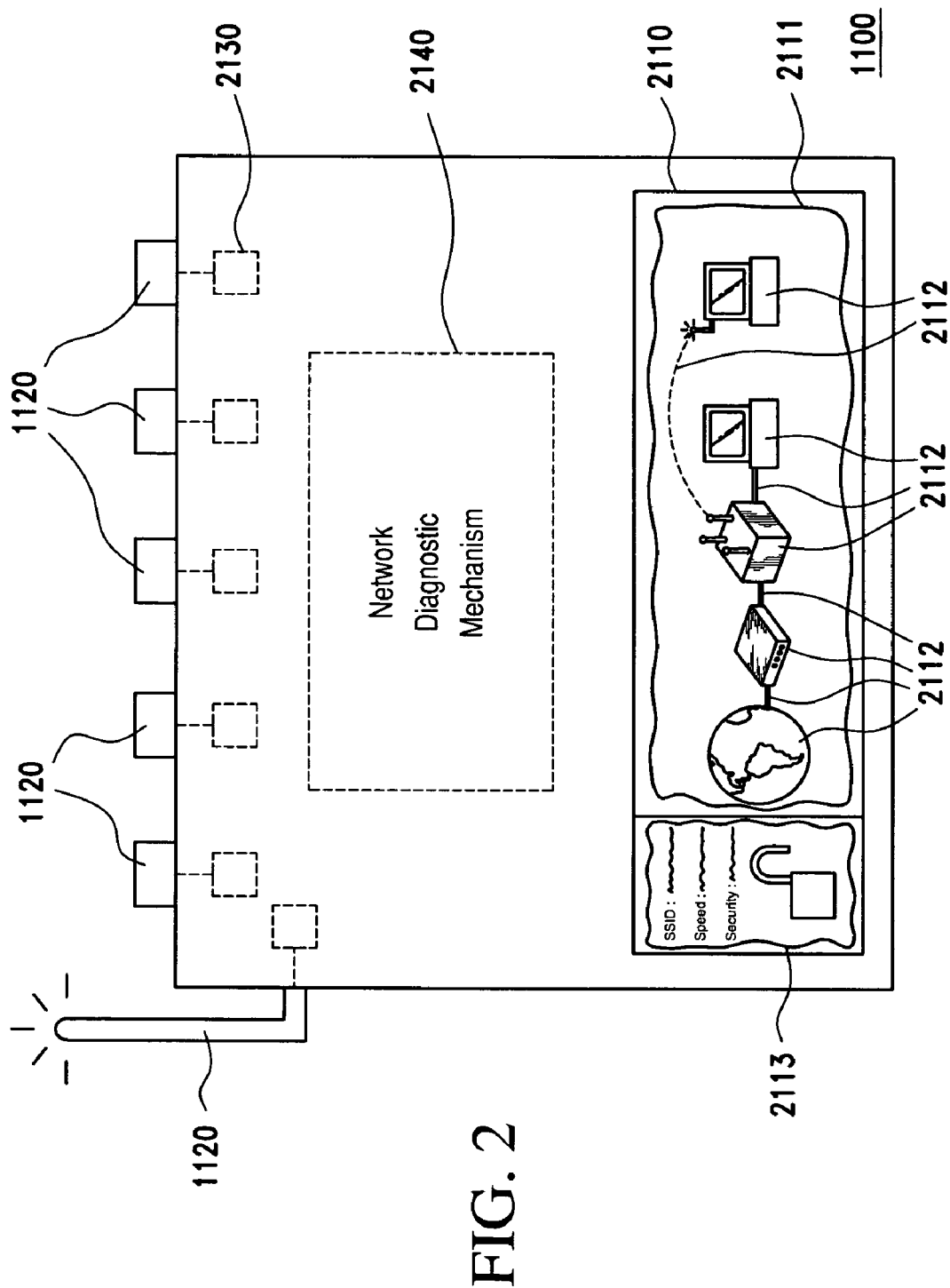
FIG. 2 illustrates a networking hardware element from the computer network of FIG. 1 in accordance with an embodiment of the invention.

FIG. 2 illustrates networking hardware element 1100. Regardless of whether networking hardware element 1100 is a wired device, a wireless device, or both, networking hardware element 1100 comprises one or more transceivers 2130. Transceivers 2130 are capable of sending and receiving communication signals between any of computer network elements 1010 (FIG. 1) coupled to networking hardware element 1100.

Networking hardware element 1100 further comprises a network diagnostic mechanism 2140, which is capable of monitoring transceivers 2130 in order to map each of computer network elements 1010 (FIG. 1), and which is also capable of determining the connection status of each of computer network elements 1010. In some embodiments, network diagnostic mechanism 2140 can be referred to as a network mapping routine, and connection status can be referred to as a communication status. The network mapping routine/network diagnostic mechanism 2140 may be implemented for networking hardware element 1100 through software, firmware, or hardware, or through a combination of these approaches.

Networking hardware element 1100 is also capable of displaying a network layout map 2111. In some embodiments, network layout map 2111 can be referred to as a network arrangement representation. Networking hardware element 1100 also comprises a display 2110, which is capable of communicating with network diagnostic mechanism 2140 and which is also capable of displaying network layout map 2111. In one embodiment, display 2110 comprises a Liquid Crystal Display (LCD). In the same or a different embodiment, display 2110 is iconographic, denoting representations 2112 of computer network elements 1010 (FIG. 1) through icons. In the same or a different embodiment, display 2110 can also comprise Light Emitting Diode (LED) sets, comprising one or more LEDs, where the LED sets correspond to representations 2112 of computer network elements 1010. While communicating with network diagnostic mechanism 2140, display 2110 can access information, for example, about which of computer network elements 1010 are present, and about the connection status of each of computer network elements 1010. Display 2110 can then display network layout map 2111 on networking hardware element 1100, based on the information gathered from network diagnostic mechanism 2140.

Network layout map 2111 on display 2110 comprises representations 2112 of computer network elements 1010 (FIG. 1), along with an indication of the connection status for computer network elements 1010 (FIG. 1). Network layout map 2111 is arranged so as to convey information to a user about the composition of computer network 1000 through representations 2112.

In one embodiment, each of representations 2112 can represent a different one of computer network elements 1010 coupled to networking hardware element 1100 in computer network 1000. In the same or a different embodiment, one or more of representations 2112 can represent a set or group of similar ones of computer network elements 1010, as explained in more detail hereinafter.

Representations 2112 can also represent the interconnections between computer network elements 1100 and networking hardware element 1100. The connection status for each of computer network elements 1010 can also be indicated through display 2110, such as by causing the corresponding one of representations 2112 to blink and/or change colors, or by otherwise making display 2110 point to the corresponding one of representations 2112. In one example, the connection status can be indicated through one or more LED sets that correspond to particular computer network elements 1010.

In one embodiment, display 2110 is also capable of displaying a network information set 2113, which can provide users with information such as the connectivity, security, and speed of computer network 1000. In some embodiments, network information set 2113 can be referred to as a network information listing.

Figure 3:
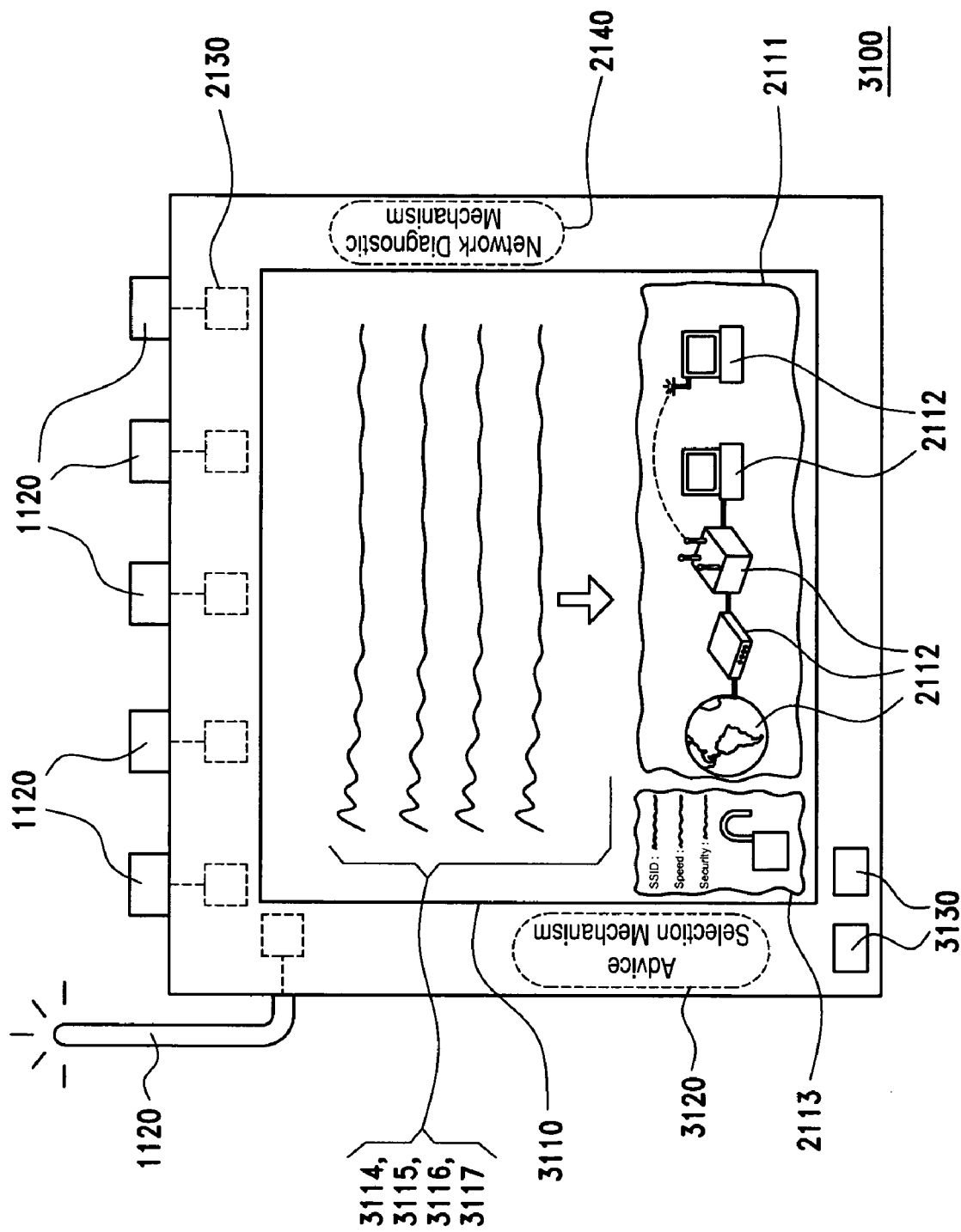
FIG. 3 illustrates a different embodiment of the networking hardware element of FIG. 2 in accordance with a different embodiment of the invention.

FIG. 3 illustrates a networking hardware element 3100, which is a different embodiment of networking hardware element 1100 of FIG. 2. Networking hardware element 3100 includes a display 3100. In one embodiment, display 3110 is capable of accomplishing the same tasks as display 2110 on networking hardware element 1100, but is also capable of displaying a network troubleshooting advice 3114. Network troubleshooting advice 3114 can be presented, for example, to guide and interact with a user while troubleshooting the connection status of computer network elements 1010 coupled through networking hardware element 3100.

In the same or a different embodiment, display 3110 is capable of accomplishing the same tasks as display 2110 on networking hardware element 1100, but is also capable of displaying a network setup advice 3115. Network setup advice 3115 can be presented, for example, to interact with the user during the setup of computer network 1000 by guiding the user through the coupling of different computer network elements 1010 to networking hardware element 3110.

In some embodiments, user input regarding network troubleshooting advice 3114 and network setup advice 3115 may be gathered through user interface 3130. User interface 3130 can be implemented on networking hardware element 3100, or externally through one of computer network elements 1010 coupled to networking hardware element 3100.

Networking hardware element 3100 can select the network troubleshooting advice 3114 and network setup advice 3115 for display 3110 through an advice selection mechanism 3120. Advice selection mechanism 3120 can be implemented through software, firmware, or hardware, or through a combination of these approaches, locally in networking hardware element 3100 or via one of computer network elements 1010 coupled to networking hardware element 3100. In the same or a different embodiment, advice selection mechanism 3120 can be a subpart of network diagnostic mechanism 2140. Networking hardware element 3100 can be configured to select proper network troubleshooting advice 3114 or network setup advice 3115 via advice selection mechanism 3120, based on interaction with the user, or based on computer network information gathered via network diagnostic mechanism 2140.

In the same or a different embodiment, networking hardware element 3100 is capable of interpreting input from a user responding to network troubleshooting advice 3114 and/or network setup advice 3115 displayed on display 3110, and then causing display 3110 to display an additional network troubleshooting advice 3116 and/or network setup advice 3117. In a different embodiment, display 3110 displays the additional network troubleshooting advice 3116 and/or network setup advice 3117 in response to network diagnostic mechanism 2140 identifying a change in the connection status of one or more of computer network elements 1010 (FIG. 1).

In the same or a different embodiment, networking hardware element 3100 is further capable of indicating on display 3110 which of representations 2112 of computer network elements 1010 correspond to network troubleshooting advice 3114 or network setup advice 3115. This indication can be done by causing corresponding representations 2112 to blink or change colors, or by otherwise making display 3110 point to or illustrate corresponding representations 2112.

Figure 4:
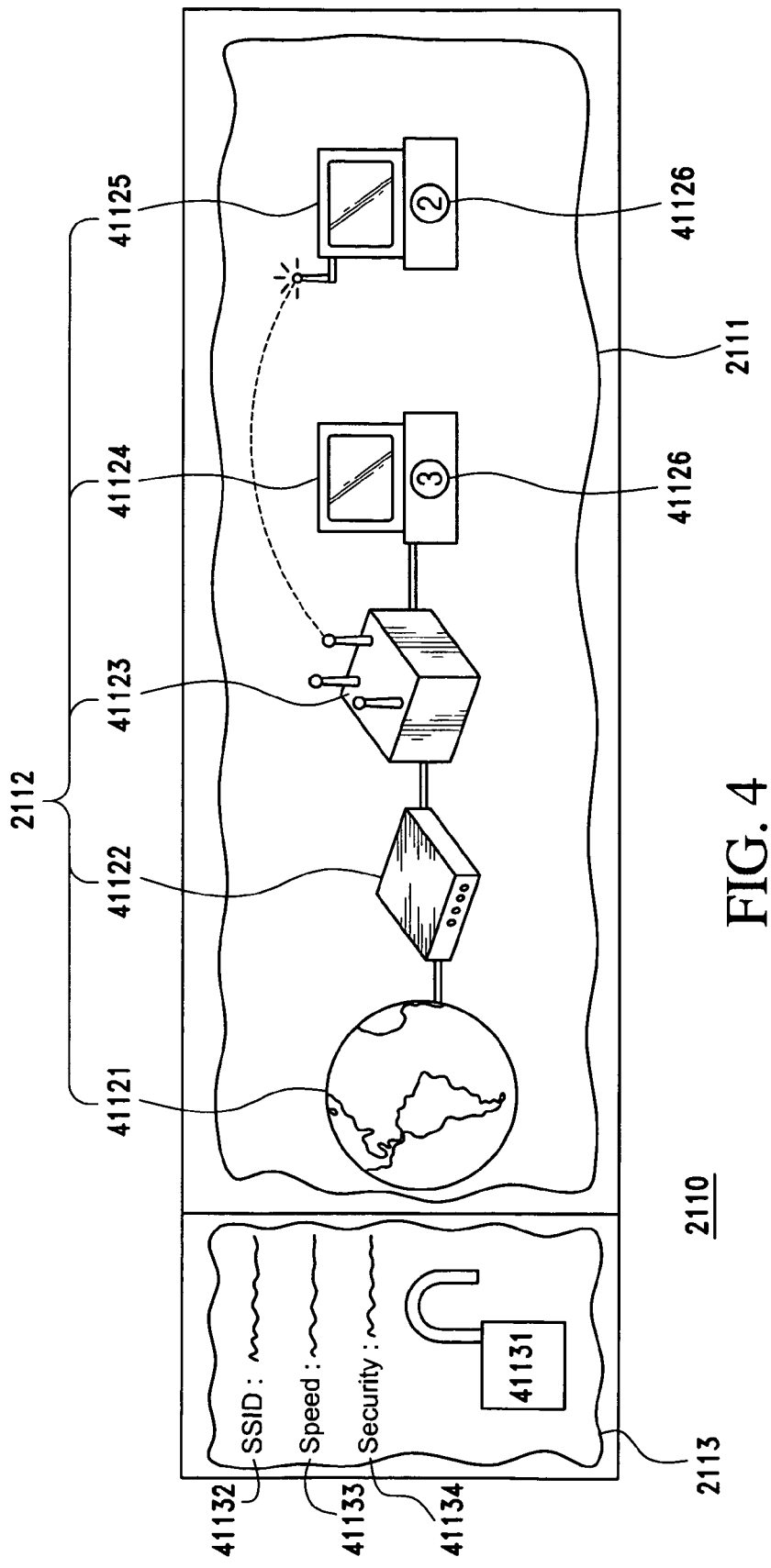
FIG. 4 illustrates a display of the networking hardware element of FIGS. 2 and 3 in accordance with an embodiment of the invention.

FIG. 4 illustrates display 2110 of networking hardware elements 1100 and 3100, from FIGS. 2 and 3, respectively. As illustrated in FIG. 4, display 2110 comprises network layout map 2111, which includes representations 2112 of computer network elements 1010 on computer network 1000, and the connection status of computer network elements 1010.

In the same or a different embodiment, display 2110 can also comprise a network information set 2113, which can present information about computer network 1000 such as a network security indicator 41131, a service set identifier 41132, a network speed 41133, and a network security standard 41134.

Network layout map 2111 in display 2110 illustrates a set of computer network element representations 2112, which can include an Internet connection representation 41121, a modem representation 41122, a networking hardware element representation 41123, a wired computer representation 41124, and a wireless computer representation 41125, along with representations for interconnections between computer network elements 1010.

In the same or a different embodiment, a first one of representations 2112 represents a plurality of one type of computer network elements 1010. For instance, wired computer representation 41124 can represent a set of one of more computers mechanically connected via wire or cable to computer network 1000 via networking hardware element 1100. Similarly, wireless computer representation 41125 can represent a set of one or more computers connected wirelessly to computer network 1000 via networking hardware element 1100.

In the same or a different embodiment, representations 2112 can further indicate the quantity of the plurality of computer network elements 1010 they represent. This quantity indication can be accomplished, for instance, through computer network element counters 41126 corresponding to particular ones of representations 2112.

Figure 5:
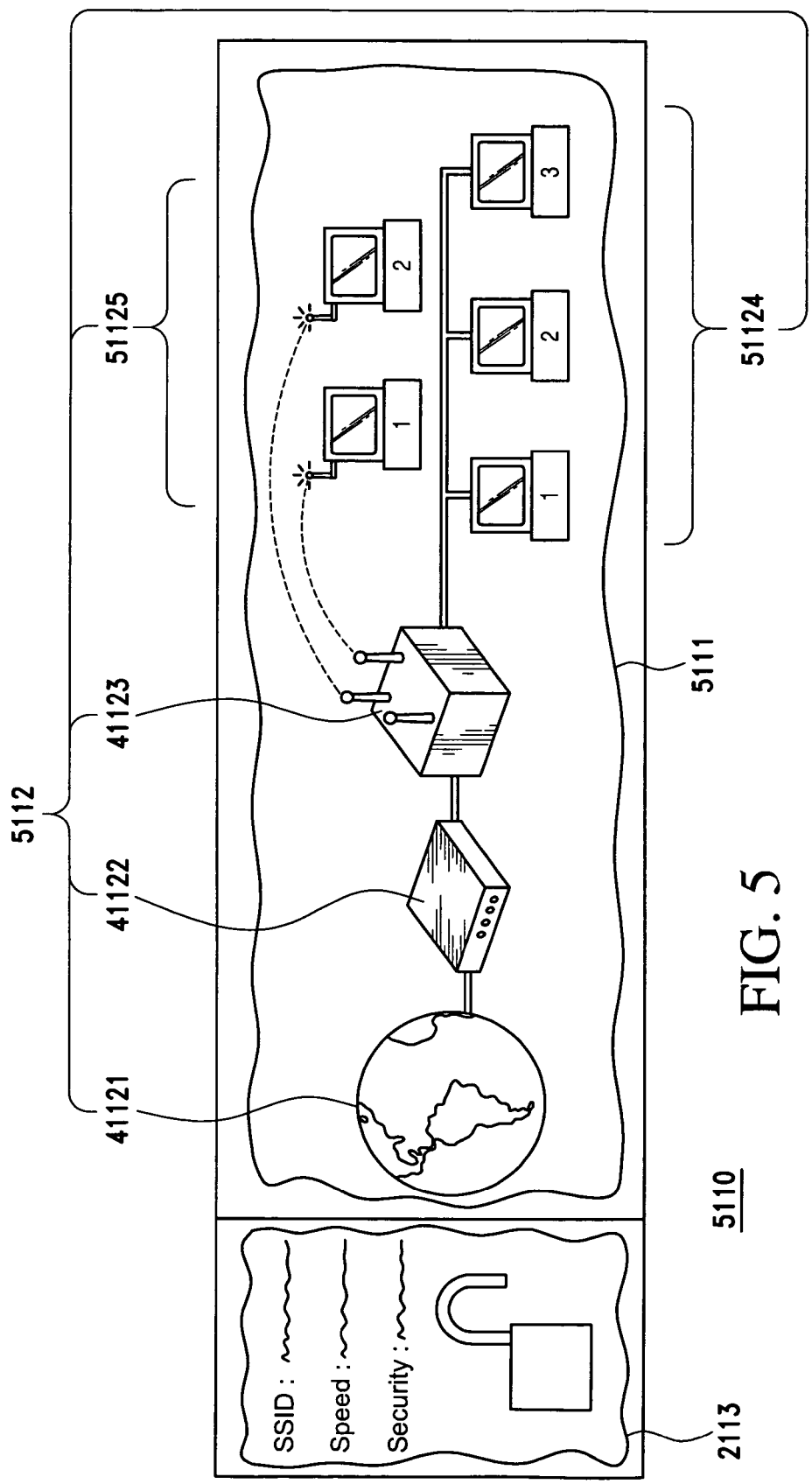
FIG. 5 illustrates different embodiment of the display of FIG. 4 in accordance with a different embodiment of the invention.

FIG. 5 illustrates a display 5110, which is a different embodiment of display 2210 illustrated in FIG. 4. Display 5110 comprises a network layout map 5111 that includes representations 5112 of computer network elements 1010. Network layout map 5111 and representations 5112 in FIG. 5 are similar to network layout map 2111 and representations 2112 in FIGS. 2, 3, and 4. However, in the embodiment of FIG. 5, each of representations 5112 can represent only an individual one of computer network elements 1010, rather than being able to represent a plurality of one type of computer network elements 1010. As a result, there could be one or more representations 5112 on display 5110 for the same type of computer network element 1010.

For instance, if there were two wired computers 1300 (FIG. 1) and three wireless computers 1200 (FIG. 1) coupled to computer network 1000, then two wired computer representations 51124 and three wireless computer representations 51125 would be indicated on network layout map 5111.

Figure 6:
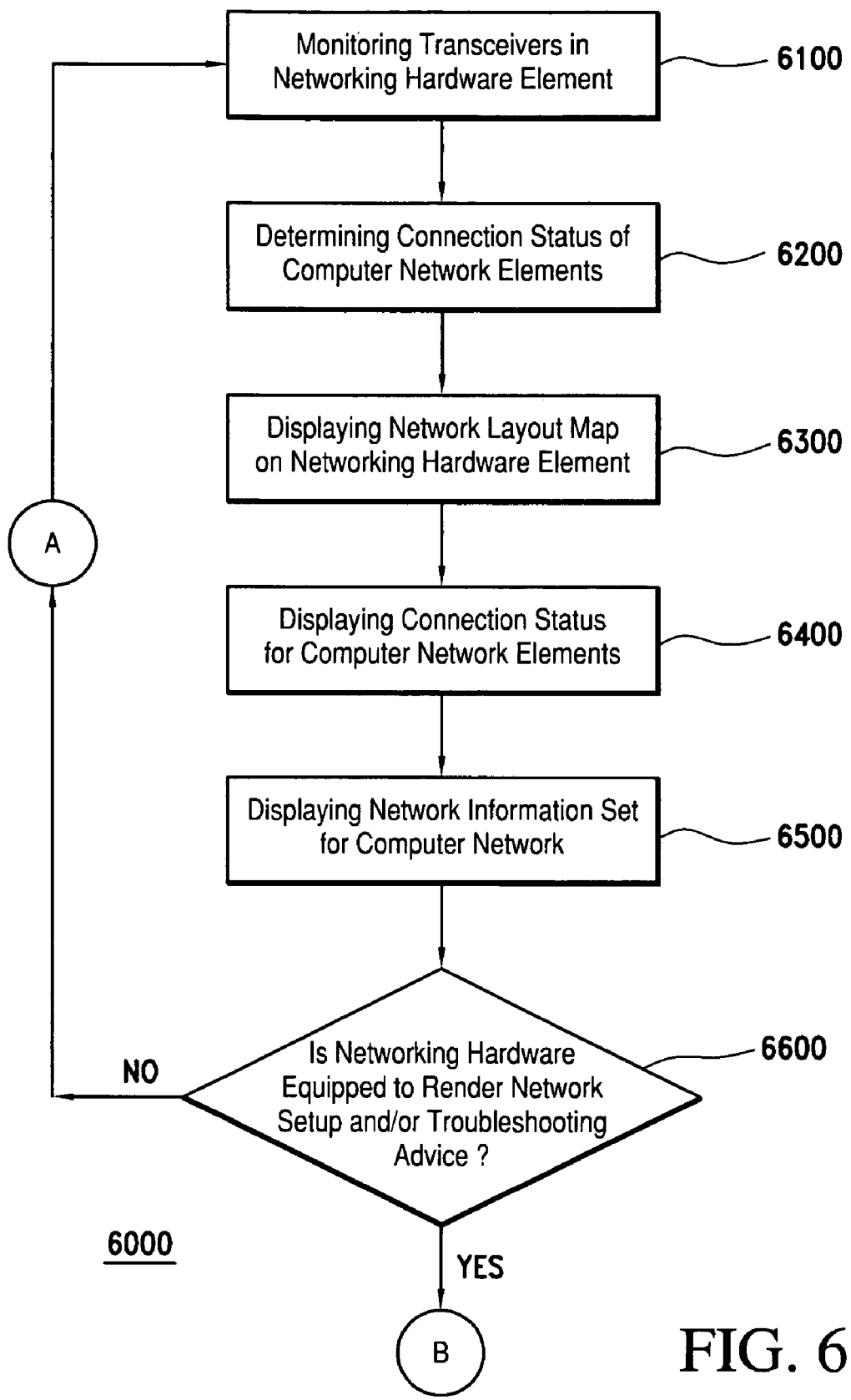
FIG. 6 illustrates a flowchart of a method for displaying a network layout map on a networking hardware element in accordance with an embodiment of the invention.

FIG. 6 illustrates a flowchart of a method 6000 for displaying a network layout map on a networking hardware element.

A step 6100 of method 6000 involves monitoring for computer network elements through transceivers in a networking hardware element. The monitoring of step 6100 can be performed by iteratively scanning for communication signals from computer network elements, which are coupled to the networking hardware element, or which are otherwise present in a computer network.

As an example, the networking hardware element in step 6100 can be networking hardware element 1100 of FIGS. 1 and 2, or networking hardware element 3100 of FIG. 3. In the same or a different example, these same networking hardware elements can perform step 6100 in FIG. 6 for a computer network, such as computer network 1000 (FIG. 1), by scanning for computer network elements, such as computer network elements 1010 (FIG. 1), through network diagnostic mechanism 2140, as described in FIG. 2.

Returning to FIG. 6, a step 6200 of method 6000 involves determining a connection status for any of the computer network elements coupled to the networking hardware element. This step can be accomplished, for example, by processing information gathered in step 6100 from monitoring transceivers in the networking hardware element. In the same or a different example, determining the connection status can be accomplished through a mechanism such as network diagnostic mechanism 2140, as described in FIG. 2. In the same or a different example, steps 6100 and 6200 of method 6000 can be subparts of a single step.

A step 6300 of method 6000 in FIG. 6 involves displaying a network layout map by showing the computer network elements present in the computer network and the interconnections between the computer network elements. The network layout map can be based on information gathered in step 6200 about the computer network elements and about the connection status of the computer network elements. As an example, step 6300 can produce a network layout map on a display similar to network layout map 2111 on display 2110 in FIGS. 2 and 4, and/or similar to network layout map 5111 on display 5110 in FIG. 5.

A step 6400 of method 6000 in FIG. 6 involves displaying a connection status for the computer network elements displayed on network layout map of step 6300. As an example, the connection status of the computer network elements can be indicated, as described in FIG. 2 and FIG. 3, such as by causing any appropriate ones of representations 2112 to blink or change colors, or by otherwise making display 2110 point to any appropriate ones of representations 2112. In the same or a different example, steps 6300 and 6400 of method 6000 can be subparts of a single step, or their sequence can be reversed.

In the same or a different example, a step 6500 of method 6000 involves displaying a network information set. The information to be displayed can be determined, for instance, by processing the information gathered in step 6100 from monitoring the transceivers in the networking hardware element. As an example, the network information set can be indicated as illustrated by network information set 2113 from FIG. 4. In the same or a different example, steps 6300, 6400, and 6500 of method 6000 can be subparts of a single step, or their sequence can be changed.

In the same or a different example, a decision step 6600 of method 6000 involves determining whether the networking hardware element is equipped to render a network setup and/ or troubleshooting advice to a user. In one example, the network setup and/or troubleshooting advice can be as described for network troubleshooting advice 3114 and/or network setup advice 3115 in FIG. 3. If the networking hardware element is not equipped to provide the network setup and/or troubleshooting advice, then method 6000 proceeds along a path "A", which repeats method 6000 at step 6100. If the networking hardware element is equipped to provide the network setup and/or troubleshooting advice, then method 6000 proceeds along a path "B", which continues method 6000 as a method 7000, as shown hereinafter in FIG. 7.

Figure 7:
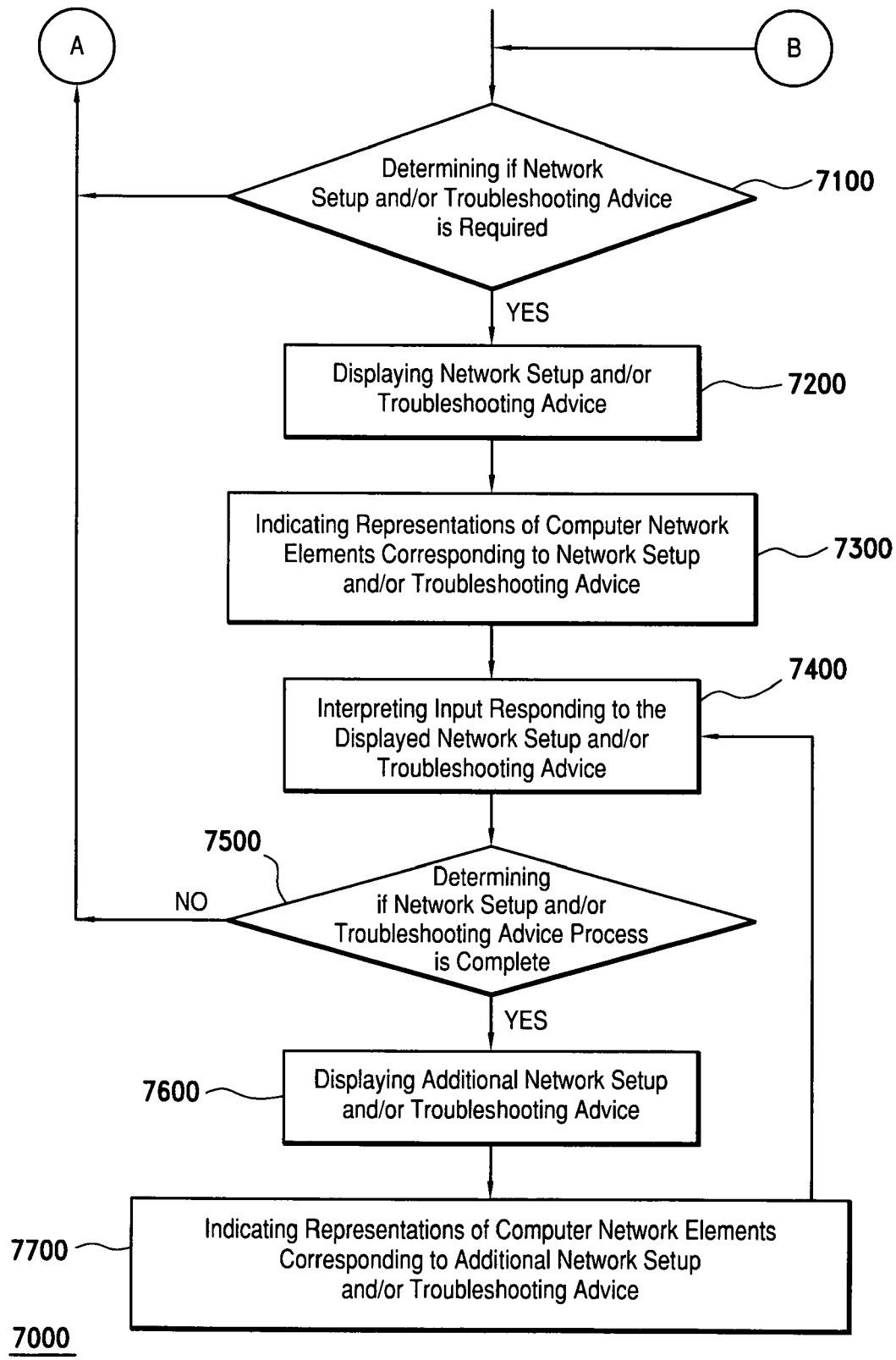
FIG. 7 illustrates a flowchart of a method for displaying a network setup and/or troubleshooting advice on a networking hardware element in accordance with an embodiment of the invention.

FIG. 7 illustrates a flowchart of method 7000 for displaying a network setup and/or troubleshooting advice on a networking hardware element.

In one example, the network setup and/or troubleshooting advice can encompass both setup advice and troubleshooting advice, such as network setup advice 3115 and network troubleshooting advice 3114 (FIG. 3). In a different example, network setup and/or troubleshooting advice can encompass only setup advice. In a different example, network setup and/or troubleshooting advice can encompass only troubleshooting advice.

A step 7100 of method 7000 involves determining whether displaying of network setup and/or troubleshooting advice on networking hardware element is required. In one example, step 7100 is reached from path "B" from FIG. 6. If the network setup and/or troubleshooting advice is not required, then method 7000 ends, and the process proceeds along path "A" to step 6100 of method 6000 (FIG. 6). If the network setup and/or troubleshooting advice is required, then method 7000 continues with a step 7200.

As an example, determining in step 7100 whether the network setup and/or troubleshooting advice is required can be done via an advice selection mechanism and/or a network diagnostic mechanism in the networking hardware element, such as advice selection mechanism 3120 (FIG. 3) and/or network diagnostic mechanism 2140 (FIGS. 2 and 3) in networking hardware element 3100 (FIG. 3). In one example, the advice selection mechanism can select the proper network setup and/or troubleshooting advice based on information gathered during steps 6100 and 6200 from FIG. 6, as related to the connection status of the computer network elements in the computer network. In the same or a different example, the advice selection mechanism can select the proper network setup and/or troubleshooting advice based on interpreting a user input or request entered, such as described for user interface 3130 on FIG. 3.

A step 7200 of method 7000 in FIG. 7 involves displaying the network setup and/or troubleshooting advice, as determined in step 7100, on the networking hardware element. As an example, step 7200 can be accomplished on the networking hardware element through a display like display 3110 for network setup advice 3115 and network troubleshooting advice 3114 (FIG. 3).

Next, a step 7300 of method 7000 in FIG. 7 comprises indicating on the networking hardware element any representations of the computer network elements corresponding to the network setup and/or troubleshooting advice displayed per step 7200. As an example, step 7300 can be implemented as described for FIG. 3 by causing corresponding representations 2112 to blink or change colors, or by otherwise making display 3110 point to or illustrate corresponding ones of representations 2112. In a different embodiment, method 7000 skips or omits step 7300 such that step 7200 proceeds directly to step 7400.

A step 7400 of method 7000 in FIG. 7 comprises interpreting input responding to the network setup and/or troubleshooting advice displayed. In one example, the input can be entered by a user, such as described for user interface 3130 (FIG. 3). In the same or a different example, the input can be received automatically from any mechanism monitoring computer network, such as described for network diagnostic mechanism 2140 (FIGS. 2 and 3) and which can also be referred to as user input. In one embodiment, method 7010 does not include step 7010.

Then, a step 7500 of method 7000 comprises determining whether the network setup and/or troubleshooting advice process is finished, based on interpreting input received in step 7400 or based on new information determined by the network diagnostic mechanism. In one example, determining whether the network setup and/or troubleshooting advice process is finished can be done via the advice selection mechanism in networking hardware element, such as advice selection mechanism 3120 in networking hardware element 3100 (FIG. 3) or network diagnostic mechanism 2140 (FIGS. 2 and 3). If the network setup and/or troubleshooting advice process is finished, then method 7000 ends, and the process proceeds to path "A", which repeats method 6000 (FIG. 6) in a cycle starting at step 6100 (FIG. 6). If the network setup and/or troubleshooting process is not yet finished, then method 7000 proceeds to a step 7600.

Step 7600 comprises displaying on networking hardware element an additional network setup and/or troubleshooting advice. Additional network setup and/or troubleshooting advice can be selected based on the interpretation, in step 7400, of input that responded to the network setup and/or troubleshooting advice displayed previously. As an example, step 7600 can be accomplished on a networking hardware element through an advice selection mechanism, such as advice selection mechanism 3120 in networking hardware element 3100, as described for both additional network setup advice 3117 and additional network troubleshooting advice 3116 (FIG. 3).

Next, step 7700 in method 7000 in FIG. 7 involves indicating on the networking hardware element any representations of the computer network elements corresponding to the displayed additional network setup and/or additional troubleshooting advice of step 7600. As an example, step 7700 can be implemented as described for FIG. 3 by causing corresponding representations 2112 to blink or change colors, or by otherwise making display 3110 point to or illustrate corresponding ones of representations 2112. In a different embodiment, method 7000 skips or omits step 7700. In another embodiment, steps 7400, 7500, 7600, and 7700 can be subparts of a single step.

Upon completion of step 7700, method 7000 proceeds back to step 7400, waiting to interpret input responding to the network setup and/or troubleshooting advice displayed. Steps 7400-7700 repeat until the network setup and/or troubleshooting advice process is finished, as determined in step 7500. When network setup and/or troubleshooting advice process is finished, method 7000 proceeds from step 7500 to path "A", which repeats method 6000 in a cycle starting at step 6100.

Although the invention has been described with reference to specific embodiments, it will be understood by those skilled in the art that various changes may be made without departing from the spirit or scope of the invention. For example, the invention is not limited to a wireless network context, and need not serve as a wireless network user interface, but may find utility in any context in which a computer system or a similar system must be monitored and/or managed. Similarly, the content and arrangement of the various screen displays can vary widely from the particular embodiments shown in the figures yet still fall within the scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the methods discussed herein may be implemented in a variety of embodiments, and that the foregoing discussion of certain of these embodiments does not necessarily represent a complete description of all possible embodiments. As a specific example, in FIG. 7, step 7300 could occur before step 7200. Accordingly, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A networking hardware element to couple computer network elements, comprising:
    one or more transceivers configured to receive communication signals from one or more of the computer network elements and to forward the communication signals to one or more different ones of the computer network elements;
    a network diagnostic mechanism that:
        iteratively scans the transceivers to monitor the computer network elements;
        maps the computer network elements; and
        determines a connection status for the computer network elements coupled to the networking hardware element based on monitoring the transceivers; and
    a display that:
        is located at a surface of the networking hardware element; communicates with the network diagnostic mechanism; and displays a network layout map of the computer network elements based on the mapping by the network diagnostic mechanism, the network layout map being iconographic and comprising:
            representations of the computer network elements;
            representations of interconnections between the networking hardware element and the computer network elements; and
            representations of the connection status of the computer network elements;
        wherein the representations of the connection status are configured to be indicative of at least one of:
            a communication problem with at least a first one of the computer network elements; or
            a non-presence of at least the first one of the computer network elements.

2. The networking hardware element of claim 1, wherein:
    at least a portion of the representations of the computer network elements of the network layout map are selected from the group consisting essentially of:
        a modem,
        the internet, and
        the networking hardware element.

3. The networking hardware element of claim 1, wherein:
    the networking hardware element is selected from the group consisting essentially of:
        a router,
        a hub,
        a switch,
        a wireless network access point, and
        a wireless networking card.

4. The networking hardware element of claim 1, wherein:
    the display further comprises an LCD.

5. The networking hardware element of claim 1, wherein:
    a first one of the representations represents a plurality of one type of the computer network elements.

6. The networking hardware element of claim 5, wherein:
    the first one of the representations indicates a quantity of the plurality of the one type of the computer network elements.

7. The networking hardware element of claim 1, wherein:
    each of the representations represents an individual one of the computer network elements.

8. The networking hardware element of claim 1, wherein:
    the display further displays a network information set selected from the group consisting essentially of:
        a network security indicator;
        a service set identifier;
        a network speed; and
        a network security standard.

9. The networking hardware element of claim 1, wherein:
    the display displays a network setup advice.

10. The networking hardware element of claim 9, wherein the networking hardware element:
    interprets an input from a user responding to the network setup advice; and then causes the display to display an additional network setup advice based on the input.

11. The networking hardware element of claim 9, wherein:
    the display indicates which of the representations correspond to the network setup advice.

12. The networking hardware element of claim 1, wherein:
    the display displays a network troubleshooting advice.

13. The networking hardware element of claim 12, wherein the networking hardware element:
    interprets an input from a user responding to the network troubleshooting advice; and then
    causes the display to display an additional network troubleshooting advice based on the input.

14. The networking hardware element of claim 12, wherein:
    the display indicates which of the representations correspond to the network troubleshooting advice.

15. A method of displaying a network layout map on a networking hardware element, the method comprising:
    iteratively scanning transceivers of the networking hardware element to:
        monitor for computer network elements; and
        forward communication signals from one or more of the computer network elements to one or more different ones of the computer network elements;

determining a connection status for the computer network elements; and then displaying an iconographic network layout map at a surface of the networking hardware element;
wherein displaying the iconographic network layout map comprises:
presenting representations of the computer network elements;
presenting representations of interconnections between the networking hardware elements and the computer network elements; and
presenting representations of the connection status of the computer network elements, the connection status configured to be indicative of at least one of:
a communication problem with at least a first one of the computer network elements; or
a non-presence of at least the first one of the computer network elements.

16. The method of claim 15, wherein:
displaying the iconographic network layout map further comprises:
presenting a first one of the representations of the computer network elements to represent a plurality of one type of the computer network elements.

17. The method of claim 15, further comprising:
displaying a network advice comprising at least one of:
a setup advice, or a troubleshooting advice;
interpreting a user input responsive to the network advice; and
displaying an additional network advice based on the user input, the additional network advice comprising at least one of:
an additional setup advice, or an additional troubleshooting advice.

18. A networking hardware element to allow computer network elements to communicate with each other, the networking hardware element comprising:
a housing;
network communication ports to couple one or more of the computer network elements to one or more different ones of the computer network elements;
a network mapping routine that:
iteratively scans the network communication ports for communication signals to monitor the computer network elements; and
establishes a communication status for each of the network communication ports; and
a network arrangement representation displayed at a surface of the housing and based on information from the network mapping routine, the network arrangement representation comprising:
icons representative of the computer network elements;
representations of interconnections for the networking hardware element and the computer network elements; and
representations of the communication status of each of the network communication ports;
wherein the representations of the communication status are configured to be indicative of at least one of:
a communication problem with at least a first one of the computer network elements coupled to a first one of the network communications port; or
a non-presence of at least the first one of the computer network elements.

19. The networking hardware element of claim 18, wherein:
a first one of the icons represents a plurality of a first type of the computer network elements.

20. The networking hardware element of claim 19, wherein:
the first one of the icons indicates a quantity of the computer network elements of the first type it represents.

21. The networking hardware element of claim 18, further comprising:
an LCD located at the surface of the housing of the networking hardware element;
wherein the LCD displays the network arrangement representation.

22. The networking hardware element of claim 18, further comprising:
an LCD;
a network troubleshooting advice; and
an additional network troubleshooting advice;
wherein:
the LCD displays the network troubleshooting advice; and
the LCD displays the additional network troubleshooting advice in response to a user input pertaining to the network troubleshooting advice.

23. The networking hardware element of claim 18, further comprising:
an LCD;
a network setup advice; and
an additional network setup advice;
wherein:
the LCD displays the network setup advice; and
the LCD displays the additional network setup advice in response to a user input pertaining to the network setup advice.

24. networking hardware element of claim 18, wherein:
the computer network elements are selected from the group consisting essentially of:
a modem,
the internet,
one or more wired computers,
one or more wireless computers, and
a printer.

25. The networking hardware element of claim 18, further comprising:
a network information listing;
wherein the network information listing lists information selected from the group consisting essentially of:
a network security indicator to indicate whether a network security standard is enabled;
a service set identifier;
a network speed; and
the network security standard.

26. The networking hardware element of claim 18, further comprising:
an LCD located at the surface of the housing of the networking hardware element; and
a network information listing;
wherein:
a first one of the icons represents one or more of a type of computer network element;
the LCD displays the network arrangement representation;
the computer network elements are selected from the group consisting essentially of:
a modem,
the internet, one or more wired computers,
one or more wireless computers, and
a printer; and
the network information listing lists information selected from the group consisting essentially of:
a network security indicator to indicate whether a network security standard is enabled;
a service set identifier;
a network speed; and
the network security standard.

27. The networking hardware element of claim 26, further comprising:
a network setup advice; and
an additional network setup advice;
wherein:
the LCD displays the network setup advice;
the LCD indicates at least one of the icons corresponding to the network setup advice; and
the LCD displays the additional network setup advice in response to a user input pertaining to the network setup advice.

28. The networking hardware element of claim 26, further comprising:
a network troubleshooting advice; and
an additional network troubleshooting advice;
wherein:
the LCD displays the network troubleshooting advice;
the LCD indicates at least one of the icons corresponding to the network troubleshooting advice; and
the LCD displays the additional network troubleshooting advice in response to a user input pertaining to the network troubleshooting advice.

* * * * *